(12) United States Patent
Gong et al.

(10) Patent No.: US 7,558,037 B1
(45) Date of Patent: Jul. 7, 2009

(54) OVER CURRENT PROTECTION CIRCUIT AND METHOD

(75) Inventors: Xiaowu Gong, Singapore (SG); Yi He, Singapore (SG); Tuck Meng Chan, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/112,885

(22) Filed: Apr. 30, 2008

(51) Int. Cl.
*H02H 3/08* (2006.01)
*H02H 9/02* (2006.01)
*H02H 3/20* (2006.01)
*H02H 9/04* (2006.01)
*H02H 7/00* (2006.01)
*H02H 9/00* (2006.01)
*H02H 3/00* (2006.01)
*H02H 3/22* (2006.01)

(52) U.S. Cl. ............... 361/93.1; 361/91.1; 361/18; 361/54; 361/55; 361/56; 361/78; 361/79; 361/86; 361/88; 361/111

(58) Field of Classification Search ............... 361/91.1, 361/18, 54–56, 78–79, 86, 88, 111
See application file for complete search history.

(56) References Cited

U.S. PATENT DOCUMENTS 6,731,486 B2 * 5/2004 Holt et al. .................. 361/91.1

* cited by examiner

*Primary Examiner*—Stephen W Jackson
*Assistant Examiner*—Dharti H Patel
(74) *Attorney, Agent, or Firm*—Slater & Matsil, L.L.P.

(57) ABSTRACT

Circuit and method for providing over-current and overloading protection with a single additional pin. A converter controller circuit is provided that includes a voltage controlled oscillator and outputs upper and lower gating signals for driving the upper and lower driving transistors in a voltage converter, for example, in an inductor-inductor capacitor half-bridge circuit topology. A current sense input pin of the circuit receives a voltage corresponding to the current flowing in the half-bridge circuit. A feedback input pin has an external capacitor coupled to it and receives a voltage from an output voltage sensor at the output terminals. Over-current protection is provided by sensing the voltage at the current sense input pin with no external components needed. Overload protection is provided by utilizing the external feedback capacitor and the feedback input pin during overload conditions. Methods for providing over-current and overload protection are disclosed.

34 Claims, 9 Drawing Sheets

OVER CURRENT PROTECTION CIRCUIT AND METHOD

TECHNICAL FIELD

The present invention relates generally to a system and method to improve the operation of a switched-mode power supply converter and, more particularly, to a system and method for efficient operation of an over-current protection (OCP) function and an over-load protection function (OLP) in a DC-to-DC converter circuit.

BACKGROUND

Generally, switching converters provides a DC output voltage from an input voltage. Circuit topologies provide a variety of approaches, including pulse width modulation (PWM) and pulse frequency modulation (PFM) topology converters. The choice of topology is determined by the needs of a particular application.

OCP is typically provided in these circuits and systems to protect the components from permanent damage in the event too much current is flowing in the circuitry. The known circuit topology presently being used must be considered in order to explain the OCP approaches. In converter applications where a PWM scheme is used, a constant duty cycle pulse is coupled to the primary switch. Feedback or other control is used to control the width of the pulse so that the output voltage is maintained at a desired level. If the output is rising above the desired level, the width of the pulses to the primary switch may be reduced, thereby reducing the amount of energy transferred to the secondary circuit by the transformer. If the output is falling below desired levels, the width of the pulse may be increased, thereby increasing the amount of energy transferred to the secondary circuit, which can then apply that energy to increase the voltage at the output.

The use of the PWM control on the primary switch also provides rapid overall control of the circuit. If a current monitor detects an over-current condition, that is, current flowing in the circuit exceeding a predetermined threshold, the control circuit can quickly reduce the pulse width of the pulses applied to the primary switch to zero, effectively shutting down the current flowing in the circuit and immediately protecting the components.

However, in another popular circuit topology for switched-mode power converters, this rapid response to an over-current situation to provide OCP is not possible. In this circuit topology, referred to as an "LLC half-bridge" topology, the control is provided using PFM. In PFM converters, an approximate symmetric duty cycle of 50% for the "on" times for the high and low drivers is used; a short "dead time" may also be provided between the high-side driver "on" and low-side driver "on" to prevent any shoot-through currents from flowing. The duty cycle of the pulses is then modulated to control the energy transferred from the primary circuit of the transformer to the secondary circuit. In the inductor-inductor capacitor LLC half-bridge, a high-side driver transistor is coupled in series with a low-side driver transistor and an output is taken at the point between them. A supply voltage is coupled to the high-side driver and a ground reference is coupled to the low-side driver. The output is coupled into the LLC circuit and the voltage output of the converter is taken across the capacitor. In this manner, the high-side and low-side driver transistors are switched alternately on and off by an oscillator, usually a voltage controlled oscillator (VCO). When the high-side driver is on, and the low-side driver is off, energy is supplied into the LLC circuit to create an output voltage. When the high-side driver is off, and the low-side driver is on, energy is discharged into ground. In this manner current can continuously flow. The switching times are arranged preferably so that the two drivers are not active at the same instant, providing a "dead-time" between the devices and a smooth switch over. However in converters using this topology, when an over-current condition is detected, it is not possible to rapidly reduce the energy flow, because the VCO requires at least one and perhaps several cycles to respond to a change in the output frequency desired. Basically, the circuit is a voltage controlled circuit and so an averaging of the output current over some interval must be used in order to regulate the output.

Present methods to provide OCP in the LLC half-bridge topology use a variety of approaches. Typically a controller IC, sometimes called a "resonant converter controller IC", provides the switching signals to the high and low-side drivers, and often includes the VCO and various control circuits. Sometimes, a predriver integrated circuit may be used with the controller IC and that pre-driver IC then drives the driving transistor gates. Typically one input to the controller IC is a current sense (CS) input. This input pin is used to sense current, or more typically provides a voltage corresponding to the output current, depending on the circuit topology used. In one known approach, a combination of principles is applied to provide OCP for a half-bridge application. The CS input pin coupled to the transformer primary must sense a voltage, since the LLC half-bridge is essentially a voltage controlled circuit. (In contrast, for a PWM application the current sense input pin can sense current to the primary, as the PWM topology is a current controlled circuit.) When the voltage on the input CS pin exceeds a certain threshold voltage, an internal switch is activated and an external capacitor in an external RC circuit is discharged; current into another input pin will then become higher. As the current into this second external pin increases, the VCO frequency is increased; alternatively if the CS input is lower than another threshold voltage, the external capacitor charges, and current into the input pin will become lower, this results in a lower VCO frequency.

Another approach applied to OCP in this prior approach implements a "latch off" function. When the voltage sensed at the input current sensor pin increases to a much higher threshold, for example 1.5V, a second comparator sets a latch and shuts down the circuit. Another circuit implements a "blanking time" function. When an internal comparator senses a voltage on an external delay capacitor greater than a very high threshold, say 3.5V, the controller IC device enters into an "auto-restart" imode. So there are three approaches to an over current situation that require at least three pins, and three external resistors and at least two external capacitors.

In another similar known controller device, when the CS input exceeds a certain threshold, the circuit will change the VCO operation from being responsive to an output feedback voltage to being responsive to a voltage from an RC external compensation circuit, until the condition passes. Again several external resistor and capacitor components are used with a comparator to put the device in a latch off condition when the current sense voltage exceeds a threshold. An auto-restart mode is triggered in this device when an over-current indicated by a voltage at the current sense input causes an RC network to charge to more than a certain voltage, meaning the condition exists for a certain time determined by the charging time of the RC network. This device requires four pins and even more external components in addition to the controller IC to implement the OCP.

A first disadvantage of these approaches is that they require added external components to implement the OCP for the driver controller device. As devices become more and more integrated and the trend to increasing product miniaturization continues, board area for a practical device becomes critical and it is, therefore, undesirable to require external components to implement an IC controlled circuit. Further, the known approaches require a number of pins in the controller IC. As system functions become more integrated, the number of pins available for a particular usage is limited and so this characteristic is also undesirable.

A continuing need thus exists for an improved circuit and methods to provide OCP protection for a converter circuit.

SUMMARY OF THE INVENTION

These and other problems are generally solved or circumvented, and technical advantages are generally achieved, by preferred embodiments of the present invention which provide an efficient and reliable circuit and methods to implement OCP in a controller for a half-bridge converter. Further, preferred embodiments of the invention provide a circuit and method for providing over current protection using a minimal number of external components, and using only a single pin of an integrated circuit In accordance with an embodiment of the present invention, a method for providing OCP and OLP in a converter circuit is to receive a voltage at a current sense input pin, the voltage corresponding to the current flowing in the external components, for example, in an LLC half-bridge. If the voltage at the current sense input pin is greater than a first threshold voltage, the converter circuit will latch off the gating signals to the driver transistors to protect the external components. If the voltage at the current sense input pin is greater than a second threshold voltage that is lower than the first threshold voltage, the converter circuit will modify the oscillation frequency of an onboard VCO to reduce the current flowing by changing the gating signals to the driver transistors. Similarly, if the voltage at the current sense input pin is less than a third threshold voltage that is lower than the second threshold voltage, the converter circuit will modify the oscillation frequency of the onboard VCO to increase the current flowing in the LLC circuit.

In accordance with another embodiment of the present invention, a method of providing OCP and OLP is presented using only the external capacitor for the feedback input, and requiring no additional external components. In this method, when a voltage at the feedback input is detected greater than a threshold voltage indicating an overload condition, a first blanking time is started. If the condition continues until the first blanking time elapses, a second blanking time begins. This second blanking time is determined by counting the charge and discharge pulses of the external feedback capacitor while it is charged by an internal pull up resistor and discharged by an internal transistor. If the number of cycles exceeds a predetermined count, the second blanking time has elapsed, and a switch off signal is output, starting an autorestart cycle. In this manner OLP is provided without the need for any added external components.

In accordance with another embodiment of the present invention, an integrated circuit for providing OCP and OLP for a half-bridge converter circuit using only a single additional current sense input pin is provided.

In accordance with another embodiment of the present invention, a circuit for providing an output voltage using a LLC half-bridge topology with OCP and OLP is disclosed.

BRIEF DESCRIPTION OF THE DRAWINGS

For a more complete understanding of the present invention, and the advantages thereof, reference is now made to the following descriptions taken in conjunction with the accompanying drawing, in which.

The figures are presented to enhance comprehension of the embodiments and are representative, are not drawn to scale, and are not limiting with respect to the embodiments, the invention or the appended claims.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention or the appended claims.

The present invention will be described with respect to preferred embodiments in a specific context, namely a switched mode power supply (SMPS) using an LLC half-bridge topology. The embodiments of the invention may also be applied, however, to other circuits where a converter circuit is used with a coil or inductor.

Figure 1:
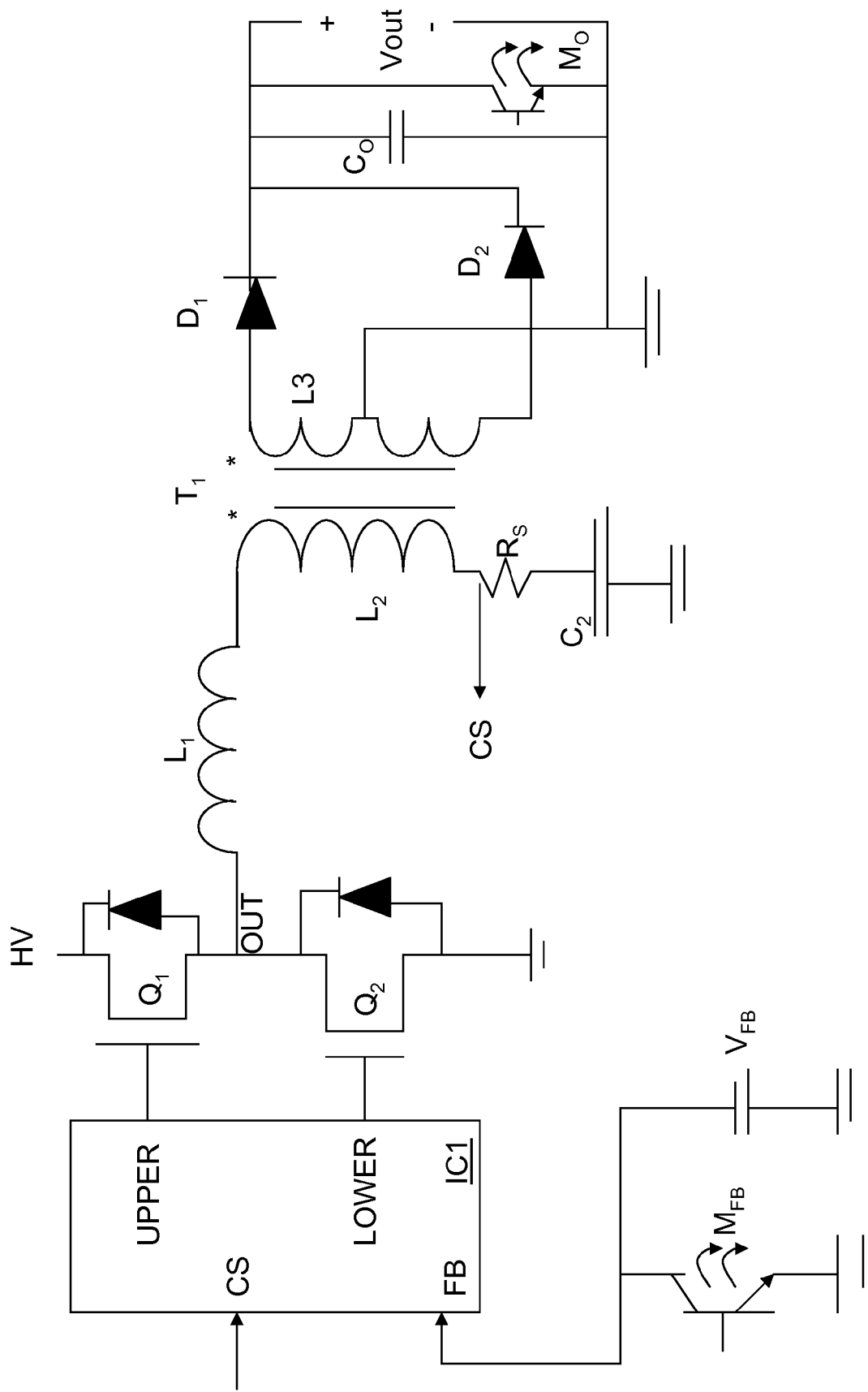
FIG. 1 illustrates a simplified circuit schematic for an LLC half-bridge converter in a typical application using a controller IC embodiment of the present invention.

With reference now to FIG. 1, there is shown an exemplary half-bridge converter circuit in an application using an exemplary controller IC labeled IC1. A high voltage supply HV is coupled to an upper driver transistor $Q_1$ that has a parasitic body diode as shown, and a lower driver transistor $Q_2$ is coupled in series with the upper transistor $Q_1$, and $Q_2$ also has a parasitic body diode shown. At node OUT coupled between the upper and lower driver transistors $Q_1$, $Q_2$, an inductor $L_1$ is coupled and in series with the inductor $L_2$. $L_2$ is typically the primary coil of a transformer $T_1$, and $L_2$ is further coupled to the capacitor $C_2$. The series of elements $L_1$, $L_2$ and $C_2$ form the LLC portion of the half-bridge. In this exemplary application, the load of the half-bridge is comprised of a voltage output circuit including secondary coil $L_3$ of the transformer $T_1$, rectifying diodes $D_1$ and $D_2$, and capacitor $C_O$. The secondary coil $L_3$ and rectifying diodes $D_1$ and $D_2$ couple energy from transformer $T_1$ that corresponds to the current flowing in primary coil $L_2$. This current is coupled into the capacitor $C_O$. The output voltage level Vout is taken across the output capacitor $C_O$. An optocoupler $M_0$ that is in coupled in parallel to the output voltage terminal Vout sends an optically coupled signal to feed back opto-coupler $M_{FB}$, and thus provides an output feedback voltage $V_{FB}$ to IC1. Further the input CS to IC1 provides a voltage corresponding to the current flowing in the primary coil of transformer $T_1$. This may be accomplished simply by taking the voltage across a series impedance, here $R_S$ is used.

In operation, the controller IC1 provides gating signals UPPER and LOWER to transistors $Q_1$ and $Q_2$ in the form of PFM signals that have a frequency determined by an internal voltage controlled oscillator (VCO). The pulse frequency is modified depending on the voltage $V_{FB}$ and the voltage on input CS, as further described below, to provide voltage regulation. Over current protection and over load protection, and also under voltage or brown out protection, are provided by embodiments as described in further detail below.

Figure 2:
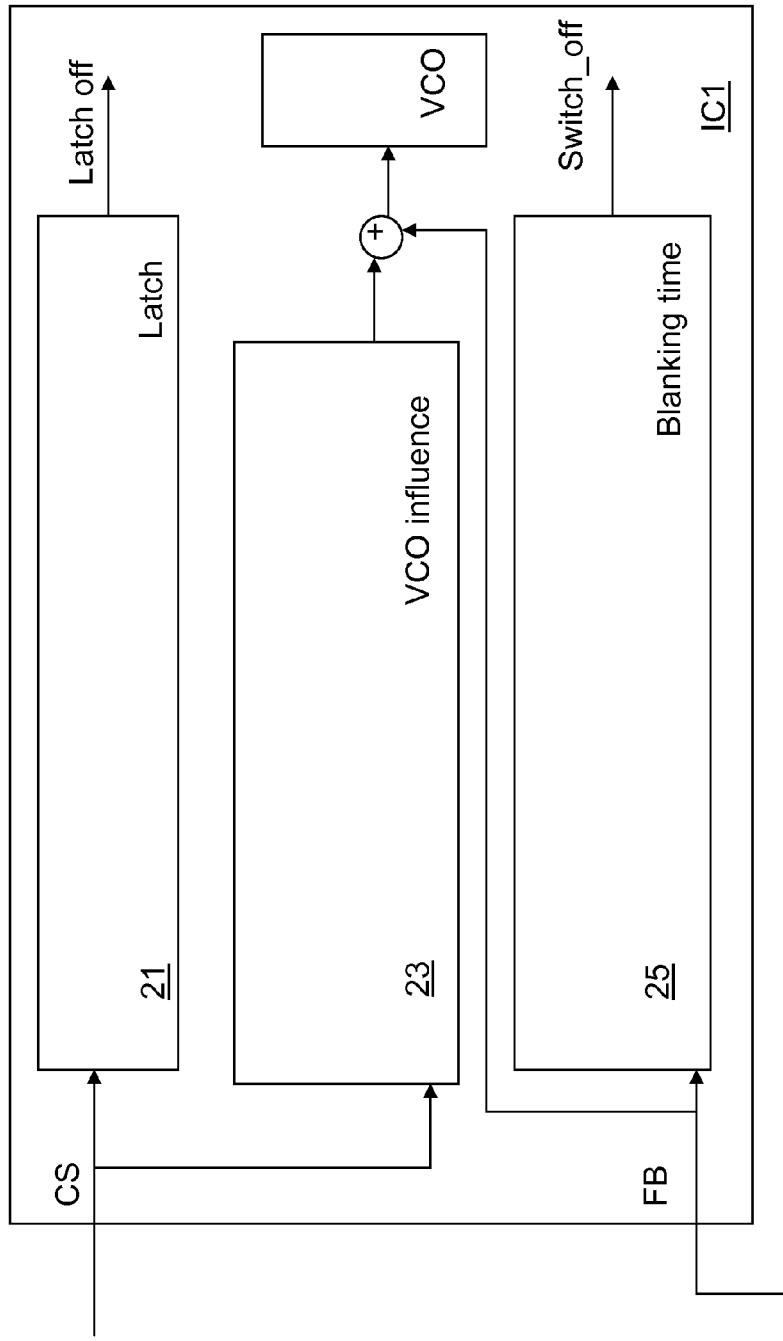
FIG. 2 illustrates a simplified block diagram of a controller IC embodiment incorporating the present invention.

FIG. 2 depicts an exemplary block diagram of a portion of integrated circuit IC1 that, with three internal functions, provide OCP from a single additional input pin CS and OLP from input pin FB. Note that input pin FB is primarily used for determining the high and low driver outputs UPPER, LOWER and the VCO frequency and so is not an additional pin used for OCP. In FIG. 2, a first circuit 21 provides an output signal "Latch off" when the voltage at input CS exceeds a high voltage threshold. VCO influence block 23 provides an output that will influence the oscillation frequency of the VCO when the voltage on input CS is above a medium level voltage threshold or below a minimum level voltage threshold. Blanking time circuit 25 provides an output "Switch off" when the voltage input to the FB pin exceeds certain voltages as will be further described below. In this manner controller IC1 provides three functions that together provide OCP and OLP for the components in the circuit using a single additional input pin CS and the existing FB pin together. Optocoupler $M_{FB}$ and capacitor $C_{FB}$ provide the feedback voltage from the output of the load via an electrically isolated feedback path.

Figure 3:
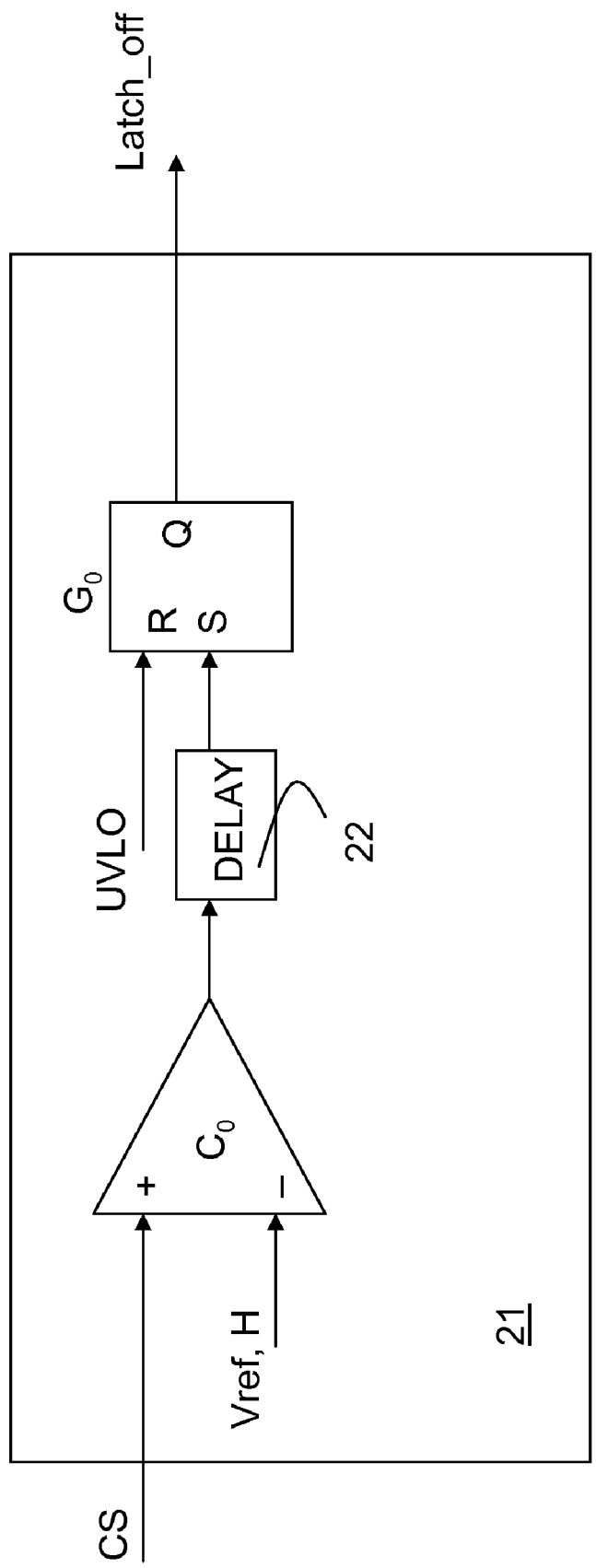
FIG. 3 illustrates a detailed circuit diagram of an implementation embodiment of the latch off function of the embodiment of FIG. 2.

FIG. 3 illustrates an exemplary embodiment of a circuit implementation of the latch off function 21 shown in FIG. 2. The Latch_off signal is used by IC1 to turn off the switching outputs UPPER and LOWER to the driver transistors. The IC will remain in the latch off state until the power to IC1, usually Vdd, is cycled to a low state and back up to the normal state again. Typically the converter IC1 will then perform a cycle referred to as a "soft-start" in which power to the load begins at a low output level (in the particular context of the LLC half-bridge, that means a high VCO frequency) and the power is slowly increased to the load. The Latch_off signal is the output of an SR flip-flop $G_0$. The output is driven high when the voltage sensed on input CS is higher than the high reference voltage Vref, H; in one embodiment this voltage Vref, H may be 1.5V for example. Vref, H may be set at other values in different applications, to get the required performance for a particular circuit. If the CS input is at this Vref, H level or higher for a period longer than delay provided by delay element 22, the flip flop $G_0$ is set. Once set, the Latch_off signal may be used to shut down the switching signals UPPER and LOWER to Q1, Q2, until when the power is cycled to IC 1. When the power is cycled, the under voltage input UVLO resets the flip flop $G_0$.

Figure 4:
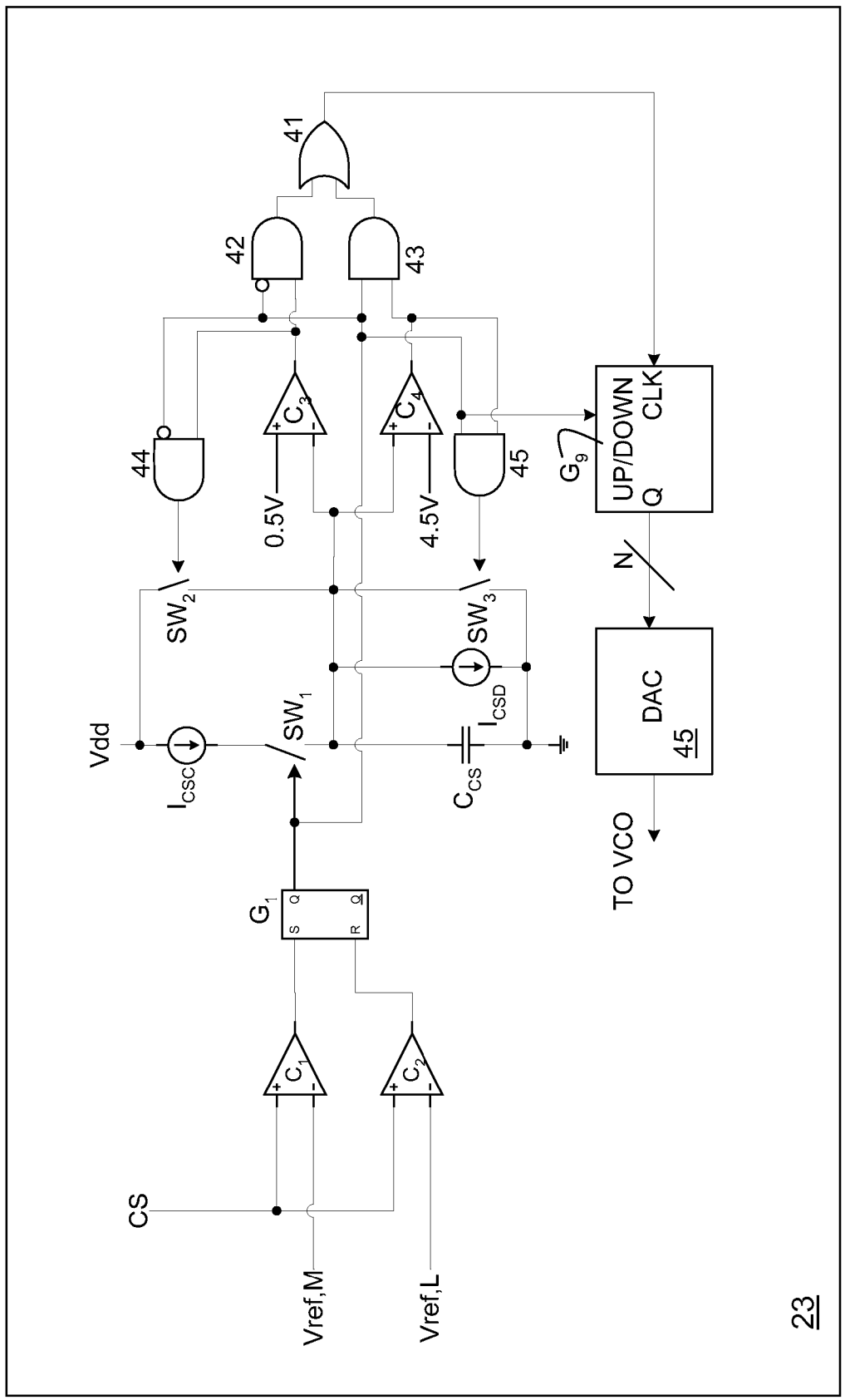
FIG. 4 illustrates a detailed circuit diagram of an implementation embodiment of the VCO influence function of FIG. 2.

FIG. 4 illustrates an embodiment implementing the VCO influence function 23 of FIG. 2. In FIG. 4, comparator $C_1$ is coupled to the CS input and to a middle voltage reference labeled Vref, M. Vref, M may be 0.8V in an exemplary application, of course other voltage levels may be used. Comparator $C_2$ receives input CS and a lower voltage reference labeled Vref, L. Vref, L will be lower than Vref, M and may be 0.75V, for example, in an exemplary application. These voltages are used to monitor the voltage on input CS and the VCO frequency will be altered in a feed-back fashion when the CS voltage is above Vref, M or below Vref, L. In this manner the circuit operates in order to modify the current flowing in the LLC circuit and therefore provide OCP.

The output of comparator $C_1$ is coupled to the set input of a flip-flop $G_1$. The output of comparator C2 is coupled to the reset input of flip-flop $G_1$.

The output Q of the flip-flop $G_1$ determines, using the comparators $C_3$ and $C_4$ and the switches $SW_1$, $SW_2$ and $SW_3$, the charge and discharge times of capacitor $C_{CS}$ in FIG. 4. The voltage on capacitor $C_{CS}$ will be compared to two voltages by comparators $C_3$ and $C_4$. The outputs of those comparators will be used to switch the switches $SW_2$ and $SW_3$ to control the charge and discharge rates. When one of these comparators' outputs becomes active, the counter $G_9$ is clocked. The direction of the counter change depends on whether the Q output from latch $G_1$ is high (or low) when the clock signal input to counter $G_9$ is pulsed.

OR gate 41 provides the clock to up/down counter $G_9$. $G_9$ may be 9 bits, 8 bits or some other width N. Digital to analog converter DAC 45 receives the digital output of counter $G_9$ and the DAC 45 output labeled "To VCO" will cause the frequency of the oscillator to increase, or decrease, based on the output of the DAC.

In operation, the voltage on input CS is compared to the references Vref, M and Vref, L; CS therefore influences the output of the VCO. If the voltage on CS is above Vref, M, the output of comparator $C_1$ sets register $G_1$, in this case, switch $SW_1$ closes and the capacitor $C_{cs}$ will be slowly charged. When the voltage on $C_{cs}$ reaches 4.5V, the output of comparator $C_4$ will become true, and gate 45 will close switch $SW_3$. The path through the switch will rapidly discharge $C_{cs}$. Gate 43 will also become true and OR gate 41 will clock the counter and thus, the counter $G_9$ will increase. So long as the voltage on CS higher than voltage Vref,M, the flip flop $G_1$ will continue to be set and this cycle will continue charging and discharging the capacitor, each cycle will clock the counter and increase the count in $G_9$ and thus, increase the oscillation from the VCO.

In the case when CS is less than voltage Vref, L, the output of comparator $C_2$ will become true, This will reset flip-flop $G_1$ and the output, Q, will then open switch $SW_1$. The circuit will now slowly discharge the capacitor $C_{cs}$ through current source $I_{CSD}$, and at each time the voltage on $C_{CS}$ is less than 0.5V, comparator $C_3$ will clock the counter $G_9$. Also, the up/down count input will now decrease the count, that is, the input is a count down when the Q output from register $G_1$ is low. Also, when comparator $C_3$ is true, the logic gate 44 closes switch $SW_2$ and rapidly charges $C_{CS}$ from Vdd. Now when $C_{CS}$ has a voltage over 0.5V, comparator $C_3$ will no longer be true and switch $SW_2$ will open, so that the capacitor $C_{CS}$ is again discharging to voltage less than 0.5V. The counter $G_9$ will again count down after comparator $C_3$ becomes true again, reducing the frequency of the oscillation until CS rises to a voltage above Vref, M.

Therefore the circuit of FIG. 4 to regulates the voltage on the current sense input CS so that it is bounded by the reference voltages Vref, M and Vref, L; the VCO frequency is influenced to attempt to maintain the voltage on CS in that range. This compensation loop provides OCP because if the CS voltage is higher, the current flowing in the output components is higher, and the circuit then attempts to increase the VCO oscillation frequency to reduce the current flowing in the output components.

Vref, M is a voltage that is less than Vref, H and more than Vref, L. In a typical example, Vref, M may be 0.8V. Vref, L may be 0.75V, so the regulation band for CS input is then limited to 0.05V, a relatively narrow band. Other voltages may be chosen for both Vref, M and Vref, L in a particular application.

Figure 5:
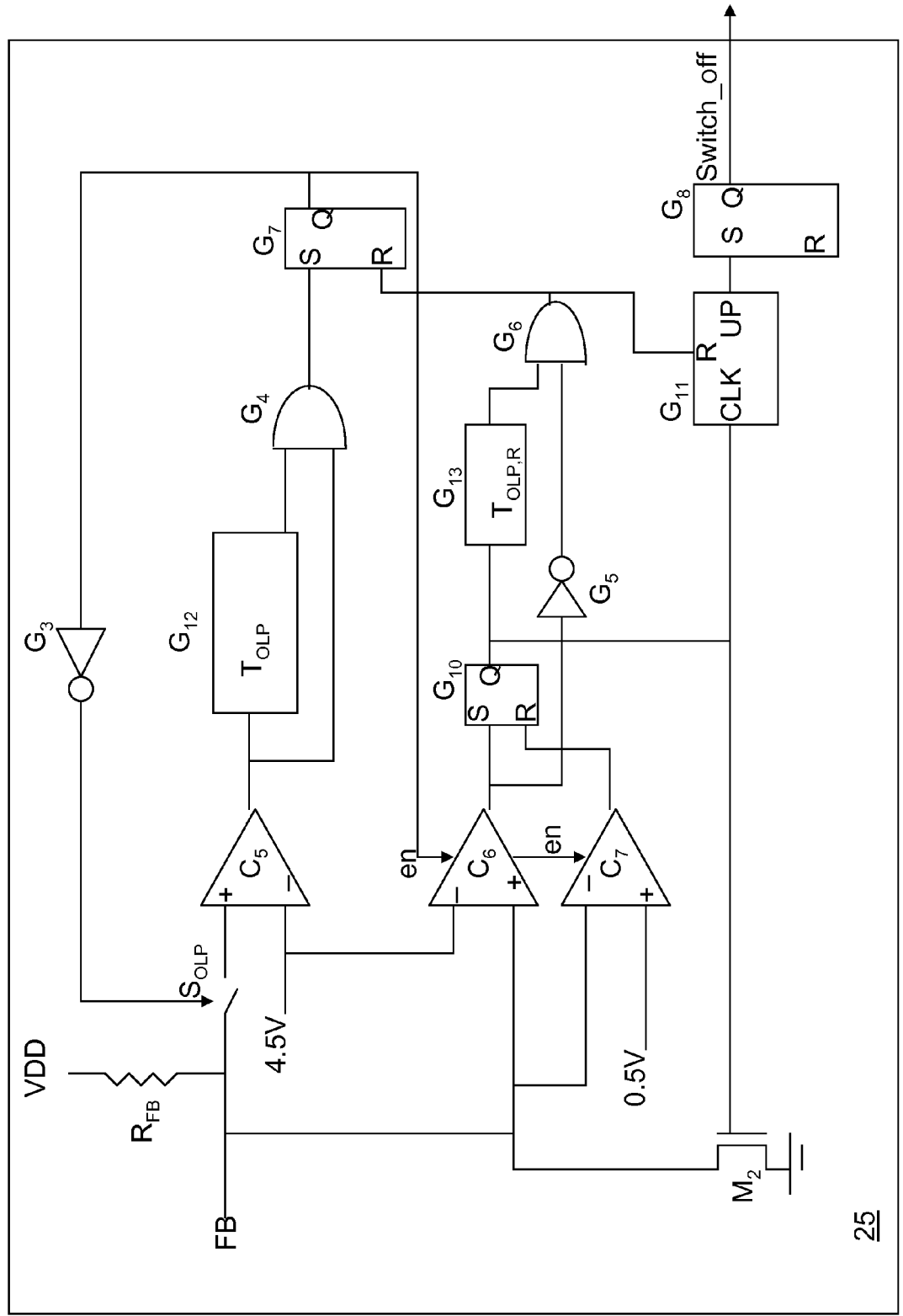
FIG. 5 illustrates a detailed circuit diagram of an implementation embodiment of the switch off function of the embodiment of FIG. 2.

FIG. 5 illustrates a detailed circuit embodiment for implementing the Switch off function 25 from FIG. 2. In FIG. 5, input FB is the feed back input. This input is used generally to provide feed back to control the internal VCO (see FIG. 2) and thus regulate the energy transferred in the application, for example as shown in the embodiment of FIG. 1, by an electrically isolated feedback path. Electrical isolation eliminates noise and immunity problems by providing a feedback signal that does not include noise or ripple from the power supply to the primary. The feedback is often provided using an optocoupler circuit as in FIG. 1. The circuit 25 is provided in addition to the voltage regulation circuitry (not shown) that is used to provide output regulation.

In FIG. 5, the FB input is used for an additional OLP function. In FIG. 5, the FB input is used internally to set a first blanking time and an extended blanking time. Since for this case the FB pin is at a high voltage, the optocoupler $M_{FB}$ clearly has no current flowing through it, thus no information is being fed back from the output. Put another way, the voltage at the FB pin is not being controlled by the optocoupler. In this case the overall circuit is in an overload condition. In this condition the embodiment illustrated in FIG. 5 provides an additional advantageous protection function using internal components, and the existing external feedback capacitor $C_{FB}$.

Capacitor $C_{FB}$ is coupled to comparators $C_5$, $C_6$ and $C_7$. Comparator $C_5$ has an output coupled to a delay line $G_{12}$ that provides a delay $T_{OLP}$. This delay time sets a first blanking time period. AND gate $G_4$ provides a pulse when the output of comparator $C_5$ is a "1" for a period exceeding the delay line time. The output of gate $G_4$ is coupled to the set input of SR flip flop $G_7$. The output of the SR latch $G_7$ is then inverted by inverter $G_3$ and that controls the switch $S_{OLP}$ at the input of the comparator $C_5$.

The comparators $C_6$ and $C_7$ also compare the input FB to voltages and those comparator outputs are coupled the set and reset inputs, respectively, of SR flip flop $G_{10}$. Delay line $G_{13}$ is coupled to the Q output of the SR flip flop $G_{10}$ and AND gate $G_6$, with inverter $G_5$, will provide a pulse to the reset input of SR flip flop $G_7$ and the counter $G_{11}$ when the output of SR flip flop G10 is a "1" for a time period exceeding the delay time of delay line $G_{13}$. UP counter $G_{11}$ is clocked by the output of flip flop $G_{10}$ and the output is coupled to the set input to SR flip flop $G_8$. The reset input of SR flip flop $G_8$ is coupled to the output Switch_off. The components $G_{10}$, $G_{13}$, $G_5$, $G_{11}$ operate together to provide an extended blanking time function.

In operation, an external capacitor coupled to the FB pin, $C_{FB}$ as shown in FIG. 1, is charged and discharged by resistor $R_{FB}$ and MOSFET transistor $M_2$ based on the operations of the circuitry. For the initial blanking time function, comparator $C_5$ will compare $V_{FB}$ to a voltage, in the exemplary embodiment of FIG. 5, set at 4.5V, when the output of SR flip-flop $G_7$ is low, because inverter $G_3$ will invert the Q output and close switch $S_{OLP}$. If the voltage $V_{FB}$ exceeds 4.5 V, a first delay time is started which determines a first internal blanking time $T_{OLP}$. This time may be, for example, 20 milliseconds. If the voltage $V_{FB}$ remains above 4.5V for a period of time greater than the initial blanking time period, the flip flop $G_7$ will be set and comparators $C_6$ and $C_7$ will be enabled by the output Q from flip flop $G_7$. If the voltage on the feedback input FB (from the optocoupler $M_{FB}$) remains above 4.5V, comparator $C_6$ will set SR flip flop $G_{10}$ and that will clock the up counter $G_{11}$. If the voltage $V_{FB}$ falls below 4.5 V, inverter $G_5$ and AND gate $G_6$ will reset the counter $G_{11}$ and that will restart the blanking period when $V_{FB}$ become higher than 4.5V again.

If the voltage $V_{FB}$ remains 4.5V for an entire blanking period such that counter $G_{11}$ is clocked up to its limit, for example, 518 times, then flip flop $G_8$ will be set and the output "Switch off" will become active. This flip flop $G_8$ will remain set and the converter IC1 may perform an autorestart sequence of the circuit, thus the OLP function will operate to protect the circuit in an overload condition, where the feedback optocoupler has no current flowing in it for an period of time that exceeds the combination of the initial blanking time and the extended blanking time that is determined by the maximum count of the counter $G_{11}$.

The counter $G_{11}$ is clocked by the charge and discharge cycle of the external capacitor $C_{FB}$. The charge/discharge time constant is determined by the RC time constant of $C_{FB}$ and internal resistor $R_{FB}$.

By choosing the resistor $R_{FB}$ and considering the value of external capacitor $C_{FB}$ the circuit may be designed for a variety of blanking times. Further the count and delay times may be varied to establish a variety of blanking times. During this overload condition, the voltage at the feedback input pin FB is determined by the charging and discharging of the capacitor $C_{FB}$, the resistor $R_{FB}$ and the transistor $M_2$. This occurs because no current is flowing in the optocoupler coupled to the feedback pin, and so it has no influence on the voltage $V_{FB}$. But if the optocoupler does start operating, it will pull the voltage $V_{FB}$ down to a level below the 4.5V threshold voltage that the charge and discharge circuitry is looking for, and the delay line $G_{13}$ in FIG. 5, with logic gate $G_6$ will reset the counter $G_{11}$ and the register $G_7$. If this event occurs before the counter reaches its maximum, the circuit 25 of FIG. 5 will stop operating until the voltage at the input again exceeds 4.5V, the threshold voltage, for another time period longer than the initial blanking time of delay $G_{12}$.

Figure 6A:
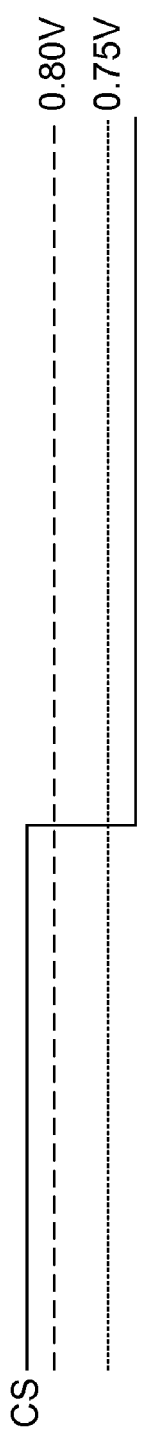
FIGS. 6a, 6b and 6c illustrate voltage waveforms for the operation of the circuit embodiment of FIG. 4 for a certain set of conditions.
Figure 6B:
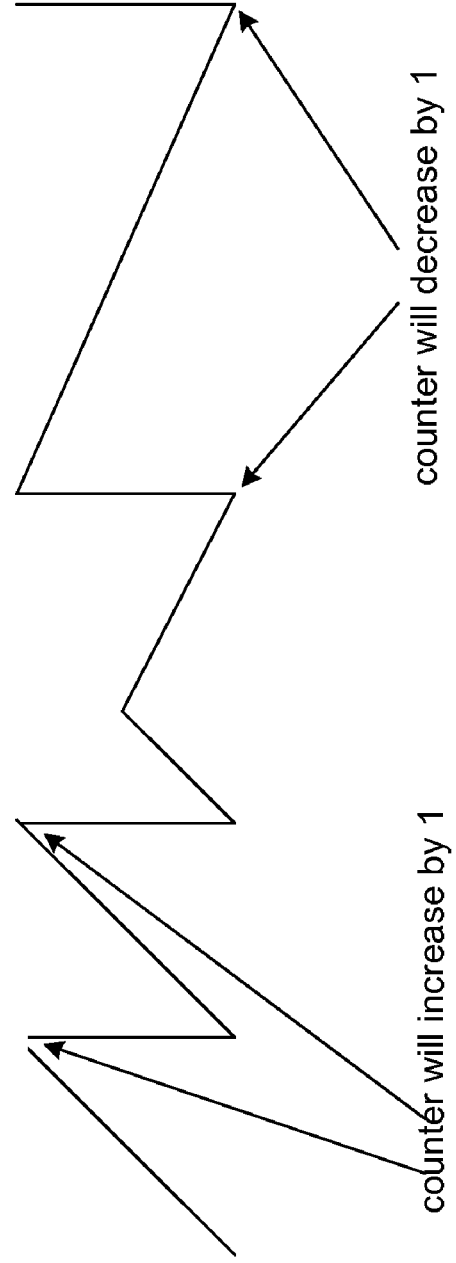
Figure 6C:

FIGS. 6a, 6b and 6c illustrate waveforms over time for the operation of the VCO influence circuit 23 of FIG. 4 over time. In FIG. 6a, initially the voltage on input pin CS is greater than 0.8V. Then CS transitions to a voltage of less than 0.75V. In FIG. 6b the effect of the voltage CS being greater than 0.8V is shown on the voltage across capacitor $C_{CS}$. When the CS voltage is above 0.8 v, the capacitor slowly charges and rapidly discharges, causing the counter to increase by one each cycle. This in turn causes the output of the DAC, a current, to increase over time. As the voltage on input CS falls to a level below 0.75V, the voltage on the capacitor $C_{CS}$ becomes a slow discharge, rapid charge cycle as seen in FIG. 6b. The counter then begins to decrease by one count each cycle. The current output of the DAC then begins to fall, as seen in FIG. 6c.

Figure 7A:
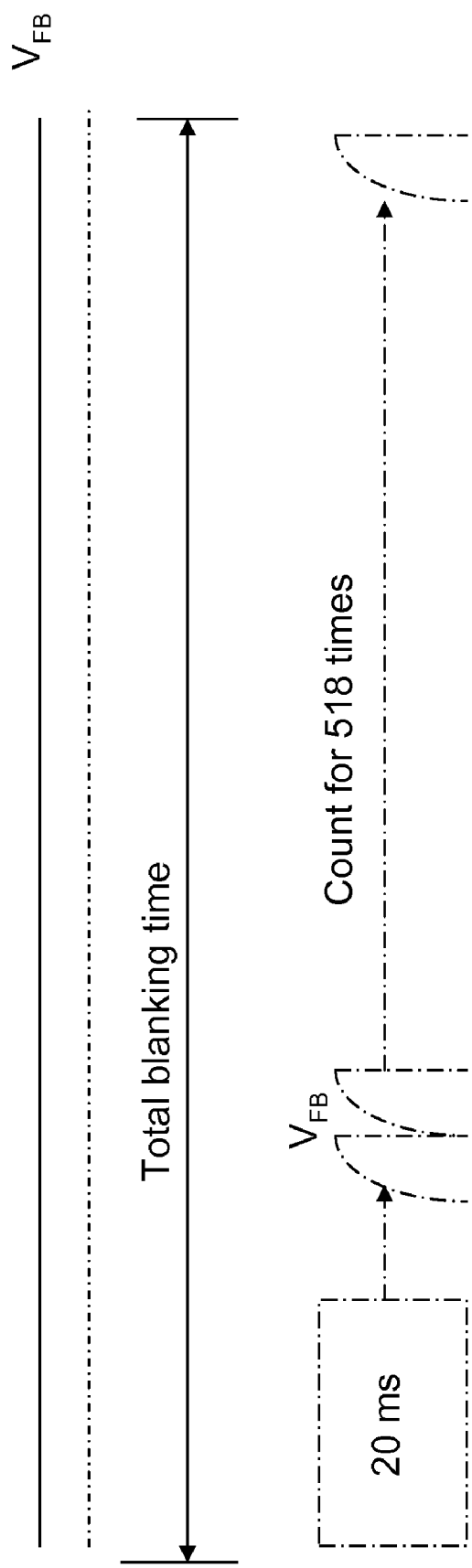
FIGS. 7a, 7b and 7c illustrate voltage waveforms for the operation of the circuit embodiment of FIG. 5 for example operations.

The operation of the switch off circuit 25 of FIG. 5 can be seen in the voltage waveforms of FIG. 7. In FIG. 7a, an example for the blanking time counters is shown where the external feedback voltage $V_{FB}$ remains above the 4.5V example threshold for the entire blanking time. In this case, following the completion of the initial blanking time of about 20 milliseconds, the set input of flip-flop $G_7$ will set that register to a "1", comparators $C_6$ and $C_7$ will become enabled. Now, the resistor $R_{FB}$, comparator $C_6$, comparator $C_7$ and transistor $M_2$ will operate to charge and discharge capacitor $C_{FB}$. The charge and discharge of capacitor $C_{FB}$ through internal resistor $R_{FB}$ will clock the counter circuit $G_{11}$, for example 518 times. When the counter reaches the maximum count, the output SR flip flop $G_8$ will be set and the "Switch_off" signal will go active. In this case the initial blanking time and the extended blanking time are both completed, and the Switch_off output will be set. The controller IC1 will then shut down the switching signals UPPER and LOWER until the controller performs an autorestart function.

Figure 7B:
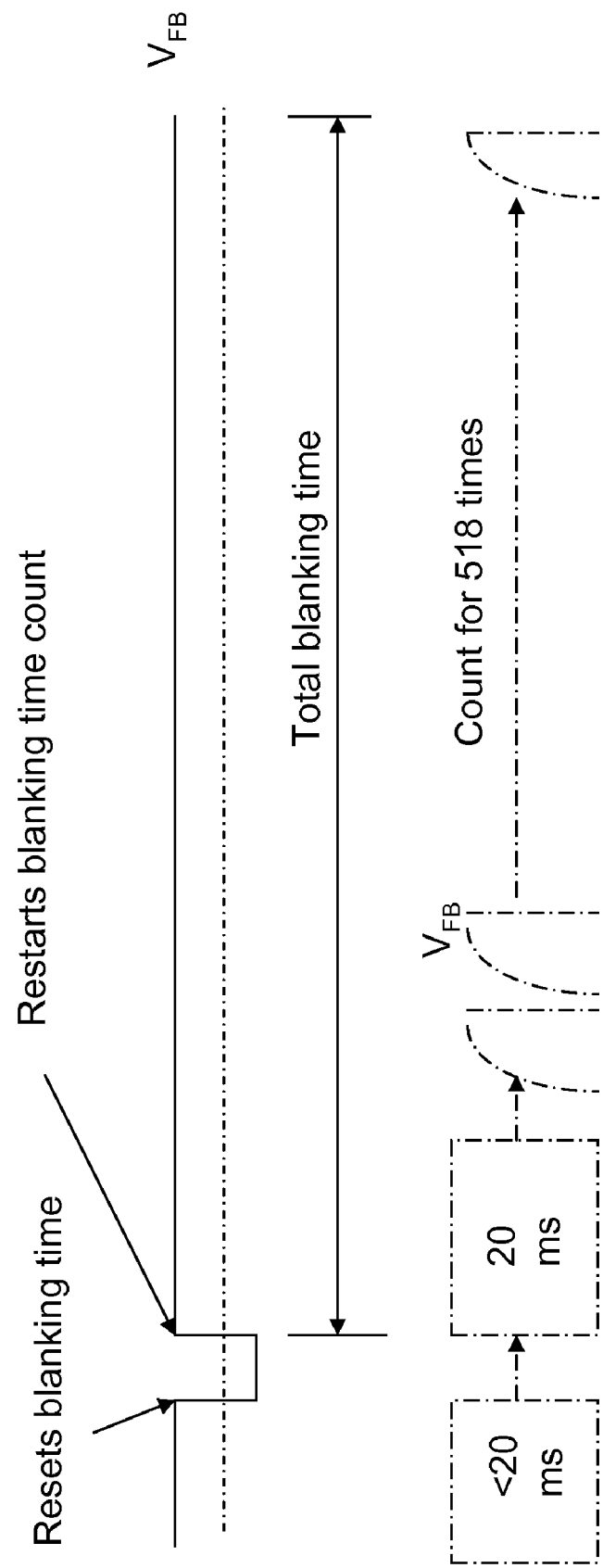

FIG. 7b illustrates the operation of the circuitry 25 of FIG. 5 for another case. In this example, the external feedback voltage $V_{FB}$ starts initially above the 4.5V threshold but then drops below 4.5V before the 20 millisecond initial blanking time elapses. As can be seen in the Figure, in the example of FIG. 7b the initial blanking time restarts when $V_{FB}$ becomes higher than 4.5V again. Since the extended blanking time circuit is not yet active (because the SR flip flop $G_7$ has not yet been set), the initial blanking time operation merely starts over when $V_{FB}$ returns to a voltage greater than 4.5V. As this voltage remains above the threshold for a continuous period for the remaining time illustrated in FIG. 7b, the Switch_off output is again set after the initial blanking time elapses, and then the extended blanking time circuitry allows the counter $G_{11}$ to reach its maximum count by the charging and discharging of the external capacitor $C_{FB}$ through resistor $R_{FB}$ and transistor $M_2$.

Figure 7C:
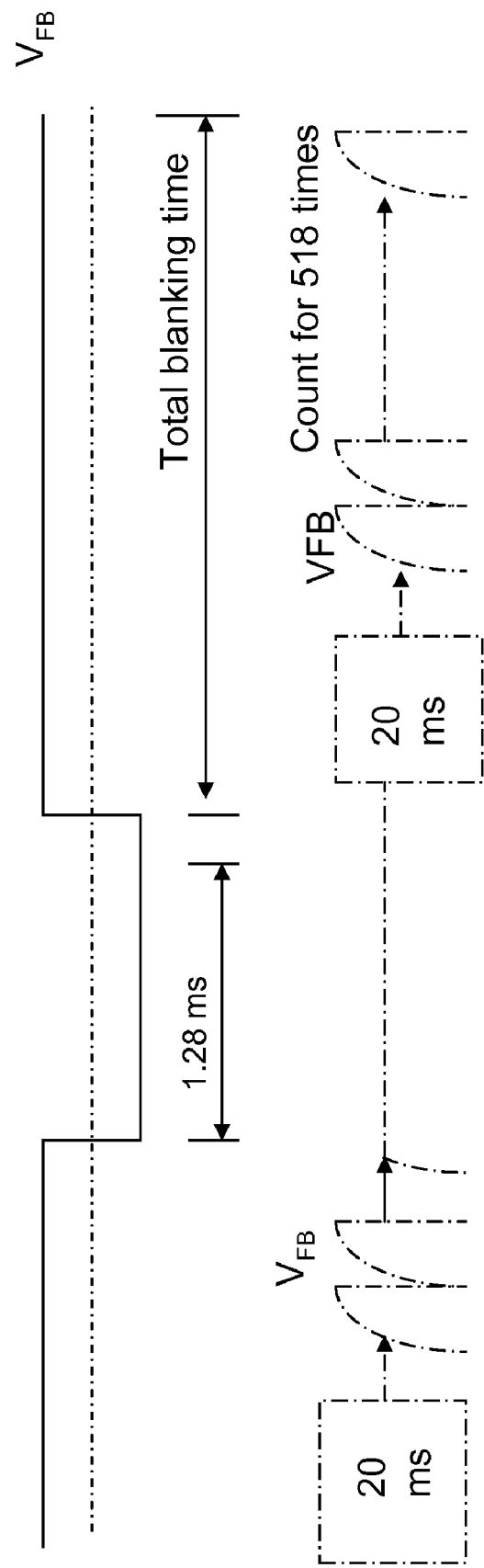

FIG. 7c depicts a third example operation of the circuit of FIG. 5. In FIG. 7c the external feedback voltage $V_{FB}$ starts at a level above 4.5V and remains there for a time long enough to cause the initial blanking time to elapse (20 milliseconds in the exemplary circuit example) and thus the SR flip flop $G_7$ is set, then the extended blanking time circuitry begins operation. Now the counter $G_{11}$ begins increasing as the external capacitor $C_{FB}$ is charged and discharged. However in the example operation of FIG. 7c, before the counter $G_{11}$ reaches its maximum count, the external voltage $V_{FB}$ again falls below the 4.5V level; this time $V_{FB}$ falls for a time longer than the extended blanking time reset delay $G_{13}$ of 1.28 milliseconds in the example circuit, and then the counter $G_{11}$ is reset, as is the flip flop $G_7$, by gate $G_6$. As the external voltage $V_{FB}$ again rises above 4.5V after that, the blanking time operations begin again with the initial blanking time of 20 milliseconds elapsing, then the extended blanking time circuit becomes active; and the up counter $G_{11}$ again begins increasing its count, only this time the counter reaches its maximum of 518 cycles. At that time, the output flip flop $G_8$ will be set, causing the "Switch_off" signal to become active.

The integrated circuit IC1 may perform an autorestart operation when the "Switch_off" signal becomes active, following UVLO detection or an autorestart signal that clears the flip flop $G_8$. The output signals UPPER and LOWER to the upper and lower switches $Q_1$, $Q_2$ will stop switching during this time and thereby protect the external components from an over-load, providing OLP protection. The use of the FB pin to provide OLP when the feedback optocoupler is not providing useful regulation information advantageously provides OLP with no requirements for additional integrated circuit pins or for additional external components beyond the capacitor $C_{FB}$. As this external component is already needed for ordinary circuit feedback regulation, use of the capacitor $C_{FB}$ does not increase the component count.

Although the present invention and its advantages have been described in detail, it should be understood that various changes, substitutions and alterations can be made herein without departing from the spirit and scope of the invention as defined by the appended claims. For example, although differential operational amplifier circuits are shown in some embodiments, known circuit design alternatives could be used to implement the functions.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated circuit, comprising:
 a voltage controlled oscillator for providing pulses at a frequency corresponding to a voltage received at an feedback input pin;
 a first switching output for driving a high-side driver transistor at a frequency proportional to the pulses;
 a second switching output for driving a low-side driver transistor at a frequency proportional to the pulses, the second switching output being a non-overlapping inverted signal from the first switching output;
 a current sense input pin for receiving a voltage corresponding to current flowing in an external load circuit;
 a latch off function that outputs a latch off signal when the voltage received at the current sense input pin is greater than a first threshold voltage;
 a VCO influence function outputting a VCO influence signal that increases the frequency of the VCO when the voltage input to the current sense input pin is greater than a second threshold voltage, and that decreases the frequency of the VCO when the voltage input to the current sense input pin is less than a third threshold voltage, the second threshold voltage being less than the first threshold voltage and greater than the third threshold voltage; and
 a switch off function that outputs a switch off signal when the voltage at the feedback input pin exceeds a maximum operating voltage for a time period greater than a blanking time period.

2. The integrated circuit of claim 1, wherein the VCO influence function further comprises:
 a first comparator comparing the voltage at the current sense input pin to the second threshold voltage and outputting a set indicator signal;
 a second comparator comparing the voltage at the current sense input in to the third threshold voltage and outputting a reset indicator signal;
 a set reset register coupled to the set indicator signal and the reset indicator signal and outputting a registered output signal;
 an internal capacitor coupled to a charge/discharge circuit, the charge/discharge circuit receiving the registered output signal;
 a counter coupled to the charge/discharge circuit by control circuitry, the control circuitry causing the capacitor to rapidly charge and slowly discharge when the registered output signal is false, and to rapidly discharge and slowly charge when the registered output signal is true, and outputting a clock signal when the capacitor reaches a threshold voltage during the charge and discharge cycles;

an up/down count signal of the counter coupled to count up when the registered output signal is true and to count down when the registered output signal is false; and a digital to analog converter receiving the output of the counter and outputting the VCO influence signal that varies proportional to the counter output.

3. The integrated circuit of claim 1 wherein the latch off function further comprises:

a comparator receiving the voltage at the current sense input pin and comparing it to the first threshold voltage and outputting a high voltage indicator signal; and a set reset register that is set by high voltage indicator signal, and outputs the latch off signal.

4. The integrated circuit of claim 1, wherein the switch off function further comprises:

a first blanking time circuit outputting a first blanking time signal when the voltage at the feedback input pin is greater than a fourth threshold voltage for a first blanking time period; and a second blanking time circuit that starts a second blanking time and outputs the switch off signal when the voltage at the feedback input pin is greater than the fourth threshold voltage for a time period that is longer than the first blanking time added with the second blanking time.

5. The integrated circuit of claim 4, wherein the second blanking time circuit further comprises:

an internal feedback resistor coupled between the feedback input pin and a positive power supply;

an internal pull down transistor coupled between the feedback input pin and a ground reference and having a control gate input; and a charge/discharge control circuit coupled to compare the voltage at the feedback input pin to the fourth reference voltage and to a fifth reference voltage, the fourth reference voltage being greater than the fifth reference voltage, the charge/discharge control circuit coupled to the control gate input to enable the pull down transistor to discharge an external capacitor when the voltage at the feedback input is greater than the fourth reference voltage, and coupled to the control gate input to enable the internal feedback resistor to charge the external capacitor when the voltage at the feedback input is less than the fifth reference voltage.

6. The integrated circuit of claim 5, wherein the second blanking time circuit further comprises a counter that increases each time the voltage on the feedback input pin exceeds the fourth voltage until the counter reaches a maximum that sets the switch off signal.

7. A circuit, comprising:

an upper driver transistor coupled between a positive power supply and a node and receiving an upper gate control signal;

a lower driver transistor coupled between the node and a ground potential and receiving a lower gate control signal;

a first inductor having an input terminal coupled to the node and having an output terminal;

a second inductor having an input terminal coupled to the first inductor output terminal and having an output terminal, the first inductor being part of a transformer having a second inductor coupled to a voltage output;

a capacitor coupled to the output terminal of the second inductor and coupled to the ground potential, the first inductor, second inductor and capacitor forming an LLC circuit;

a current sense resistor coupled in series with the LLC circuit and outputting a current sense voltage proportional to the current flowing in the LLC circuit; and a converter integrated circuit, comprising:

an internal voltage controlled oscillator (VCO) and circuits outputting the upper gate control signal at an UPPER output pin and the lower gate control signal at a LOWER output pin, the upper and lower gate control signals being non-overlapping pulses of a frequency determined by the VCO frequency;

an over-current protection coupled to a current sense voltage input pin for receiving the current sense voltage, and outputting a latch off signal when the current sense voltage is greater than a first threshold voltage, and outputting a VCO influence signal to the VCO to change the frequency of the VCO when the voltage at the current sense voltage input pin is above a second threshold voltage that is less than the first threshold voltage, and outputting an opposite VCO influence signal when the voltage at the current sense voltage input pin is below a third threshold voltage that is lower than the second threshold voltage; and an overload protection function coupled to a feedback voltage input pin outputting a switch off signal when the voltage at the feedback voltage input pin is greater than a fourth threshold voltage for a time period that exceeds the sum of a first and an extended blanking time.

8. The circuit of claim 7, wherein the converter integrated circuit stops supplying the upper and lower gate control circuit signals at the upper and lower output pins when the latch off signal is set.

9. The circuit of claim 7, wherein the converter integrated circuit stops supplying the upper and lower gate control circuit signals at the upper and lower output pins when the switch off signal is set.

10. The circuit of claim 7, wherein the over-current protection function further comprises:

a circuit outputting the latch off signal when a first comparator coupled to the voltage at the current sense voltage input pin determines the voltage exceeds the first threshold voltage; and a VCO influence circuit that outputs the VCO influence signal to increase the frequency of the VCO when the voltage at the current sense input pin is greater than the second threshold voltage and outputs the VCO influence signal to decrease the frequency of the VCO when the voltage at the current sense input pin is lower than the third threshold voltage.

11. The circuit of claim 10, wherein the VCO influence circuit further comprises:

a first comparator outputting a set signal when the currents sense input pin voltage is greater than the second threshold voltage;

a second comparator outputting a reset signal when the voltage at the current sense input pin is less than the third reference voltage;

a set reset register that is set in response to the set signal and reset in response to the reset signal and having a registered output;

an internal current sense capacitor;

a charge/discharge circuit coupled to charge the internal current sense capacitor rapidly and discharge the internal current sense capacitor slowly when the registered output is reset, and coupled to discharge the internal current sense capacitor rapidly and charge the internal current sense capacitor slowly when the registered output is set;
a counter coupled to count when the internal current sense capacitor is charged and discharged to predetermined levels, the counter having an up/down input that causes the counter to increase when the registered output is set and decrease when the registered output is reset; and
a digital to analog converter (DAC) coupled to the counter and outputting the VCO influence signal that increases when the count increases and decreases when the count decreases.

12. The circuit of claim 7, wherein the overload protection circuit further comprises:
a first blanking time circuit that sets a first time signal when the voltage at the feedback voltage input pin is greater than a fourth threshold voltage for a time exceeding a first blanking time; and
a second blanking time circuit that sets the switch off signal when the voltage at the feedback input pin is greater than the fourth threshold voltage for a time exceeding the sum of the first blanking time and a second blanking time.

13. The circuit of claim 12, wherein the first blanking time circuit will stop if the voltage at the feedback input pin returns to a voltage less than the fourth threshold before the first blanking time elapses.

14. The circuit of claim 13, wherein the second blanking time circuit will stop and reset the first blanking time circuit if the voltage at the feedback input pin returns to a voltage less than the fourth threshold voltage for time that exceeds a blanking time reset delay.

15. The circuit of claim 12, wherein the second blanking time circuit further comprises:
an internal feedback resistor coupled to the feedback input pin and to a positive voltage, a discharge transistor coupled between the feedback input pin and a ground potential, and a control circuit for charging the external feedback capacitor coupled to the feedback input pin to a first upper voltage and discharging the external feedback capacitor coupled to the feedback input pin to a first lower voltage;
an upcounter that is increased each time the external feedback capacitor is charged to the upper level voltage by the charge/discharge circuit, the upcounter setting a register when a maximum count is reached; and
the register outputting the switch off signal when the maximum count is reached.

16. A method, comprising:
providing an upper gate control signal to an upper driving transistor coupled to supply a voltage to a node;
providing a lower gate control signal to a lower driving transistor coupled between the node and a ground reference;
coupling an inductor-inductor capacitor (LLC) circuit to the node and to an output voltage;
providing a circuit supplying the upper and lower gate control signals to the upper and lower driving transistors responsive to the frequency of a voltage controlled oscillator (VCO), the upper and lower gate controls signals being non overlapping periodic signals with a frequency proportional to the VCO frequency;
providing a voltage feedback at a feedback input to the circuit from the voltage output to the circuit, the circuit modifying the frequency of the VCO responsive to the feedback input;
coupling an external feedback capacitor between the feedback input pin and the ground potential;
providing a current sense voltage proportional to the current flowing in the LLC circuit at a current sense input to the circuit;
outputting a latch off signal from an over-current protection function in the circuit when the voltage at the current sense input is greater than a first threshold voltage, and outputting a VCO influence signal for modifying the VCO frequency when the voltage at the current sense input is greater than a second threshold voltage that is less than the first threshold voltage, and outputting the VCO influence signal modifying the VCO frequency when the voltage at the current sense input is less than a third threshold voltage that is less than the second threshold voltage; and
outputting a switch off signal to provide overload protection for the LLC circuit when the voltage at the feedback input is greater than a fourth threshold voltage for a time exceeding a blanking time period.

17. The method of claim 16, wherein outputting a switch off signal to provide overload protection further comprises:
providing a first blanking time circuit that sets a first blanking time register if the voltage at the feedback input to the circuit exceeds the fourth threshold voltage for a time greater than a first blanking time period; and
stopping the blanking time circuit if the voltage at the feedback input pin is greater than the fourth threshold for a time less than the first blanking time period, and then returns to a voltage less than the fourth threshold voltage.

18. The method of claim 17 wherein outputting a switch off signal further comprises:
enabling a second blanking time circuit when the register is set indicating the first blanking time has been exceeded;
charging the external feedback capacitor through an feedback resistor internal to the circuit to a first upper level;
discharging the external feedback capacitor through a discharge transistor internal to the circuit to a first lower level;
increasing a counter each time the external feedback capacitor is charged to the upper level; and
outputting the switch off signal when the count reaches a predetermined maximum count value.

19. The method of claim 18, and further comprising:
determining after the first blanking time has elapsed and before the counter reaches the predetermined maximum count that the voltage at the feedback input to the circuit has returned to a voltage less than the fourth threshold voltage for a time period greater than a blanking time reset delay time; and
resetting the counter and the first blanking time register.

20. The method of claim 17, wherein outputting a VCO influence signal further comprises:
determining when the voltage at the current sense input to the circuit is greater than the second threshold voltage and setting a registered output;
determining when the voltage at the current sense input to the circuit is less than the third threshold voltage and resetting a registered output;
providing an current sense capacitor internal to the circuit;
when the registered output is set, rapidly discharging the current sense capacitor and slowly charging the current sense capacitor;
when the registered output is reset, rapidly charging the current sense capacitor and slowly discharging the current sense capacitor;
clocking an up/down counter;

inputting an up signal to the up/down counter when the registered output is set and a down signal to the up/down counter when the registered output is reset; and outputting the VCO influence signal that increases as the counter increases and decreases as the counter decreases.

21. The method of claim 17 wherein the first threshold voltage is at least 1.5 Volts.

22. The method of claim 17 wherein the second threshold voltage is at least 0.8 Volts.

23. The method of claim 17 wherein the third threshold voltage is not more than 0.75 Volts.

24. The method of claim 17 wherein the fourth threshold voltage is at least 4.5 Volts.

25. A method of providing overload (OLP) and overcurrent (OCP protection for a half-bridge DC convertor circuit having a DC output, comprising:

providing an inductor-inductor capacitor (LLC) circuit coupled to a node;

providing an upper driver transistor coupling the node to a positive power supply, responsive to a periodic upper gating signal having a duty cycle;

providing a lower driver transistor coupling the node to a ground potential, responsive to a periodic lower gating signal having the duty cycle and being non overlapping with the upper gating signal;

providing an integrated circuit that outputs the upper and lower gating signals of said DC convertor circuit, the integrated circuit receiving only a current sense voltage input and a feedback voltage input as signals necessary for controlling said OLP and OCP protection;

coupling an external feedback capacitor to the feedback voltage input;

coupling a feedback sensor to the feedback voltage input; and wherein the integrated circuit provides the upper and lower gating signals responsive to the frequency of an on board voltage controlled oscillator (VCO), and the integrated circuit provides over-current protection responsive to a voltage at the current sense voltage input that corresponds to the current flowing in the LLC circuit.

26. A method, comprising:

providing an inductor-inductor capacitor (LLC) circuit coupled to a node;

providing an upper driver transistor coupling the node to a positive power supply, responsive to a periodic upper gating signal having a duty cycle;

providing a lower driver transistor coupling the node to a ground potential, responsive to a periodic lower gating signal having the duty cycle and being non overlapping with the upper gating signal;

providing an integrated circuit that outputs the upper and lower gating signals, the integrated circuit having a current sense voltage input and a feedback voltage input;

coupling an external feedback capacitor to the feedback voltage input;

coupling a feedback sensor to the feedback voltage input; and wherein the integrated circuit provides the upper and lower gating signals responsive to the frequency of an on board voltage controlled oscillator (VCO), and the integrated circuit provides over-current protection responsive to a voltage at the current sense voltage input that corresponds to the current flowing in the LLC circuit, and further comprising:

latching off the upper and lower gating signals to the upper and lower driver transistor when the voltage at the current sense input pin exceeds a first threshold voltage; and modifying the frequency of the VCO when the voltage input to the current sense voltage input pin is greater than a second threshold voltage that is less than the first threshold voltage, and modifying the frequency of the VCO oppositely when the voltage at the current sense input pin is less than a third threshold voltage that is less than the second threshold voltage.

27. The method of claim 26 wherein the integrated circuit switches off the upper and lower gating signals when the voltage at the feedback voltage input exceeds a fourth threshold voltage for a time that is greater than a blanking time period, indicating an overload at the output.

28. The method of claim 27 wherein the integrated circuit switches off the upper and lower gating signals further comprises:

determining when the voltage at the feedback input pin is greater than the fourth threshold voltage for a period of time greater than a first blanking time period;

setting a registered output at the end of the first blanking time period;

determining when the voltage at the feedback input pin is greater than the fourth threshold voltage for a time period greater than the sum of the first blanking time period and a second blanking time period, the blanking time period; and switching off the integrated circuit when the blanking time period is exceeded.

29. The method of claim 28, wherein determining when the voltage at the feedback input pin is greater than the fourth threshold voltage for a time period greater than the sum of the first blanking time period and a second blanking time period further comprises:

detecting the registered output is set;

charging the external feedback capacitor coupled to the feedback input pin through an internal feedback resistor to a first upper voltage level;

discharging the external feedback capacitor coupled to the feedback input pin through an internal transistor to a first lower voltage level;

clocking an up counter each time the external capacitor is charged to the first voltage level;

repeating the charging and discharging and clocking steps;

detecting a predetermined maximum count in the upcounter; and setting a switch off signal when the maximum count is reached.

30. The method of claim 29 and further comprising:

after the first blanking time has elapsed and prior to the maximum count being detected, determining that the voltage at the feedback input pin has fallen to a voltage less than the fourth threshold for a time period greater than a overload protection reset time; and resetting the counter and the registered output to stop the blanking time function.

31. The method of claim 28 and further comprising:

after detecting that the voltage at the feedback voltage pin is greater than the fourth threshold voltage, detecting that the voltage returns to a voltage less than the fourth threshold voltage before the first blanking time elapses; and stopping the first blanking time.

32. A circuit, comprising:
an inductor-inductor capacitor half-bridge circuit coupled a node to deliver energy to a rectifier circuit with an output;
an upper driver transistor coupling a positive power supply to the node responsive to a periodic upper gating signal;
a lower driver transistor coupling the node to a ground reference responsive to a periodic lower gating signal, the lower gating signal being complementary to and non overlapping with the upper gating signal;
a integrated circuit comprising:
  an upper output pin for outputting the upper output signal having a frequency corresponding to the frequency of an on board voltage controlled oscillator (VCO);
  a lower output pin for outputting the lower output signal having a frequency corresponding to the frequency of the VCO;
  a feedback voltage input pin for receiving an input voltage corresponding to the output voltage of the rectifier; and
  a current sense input pin for receiving a voltage corresponding to the current in the LLC half-bridge; and
  wherein the integrated circuit provides a first over-current protection function by stopping the outputs of the upper and lower gating signals when the voltage at the current sense input pins exceeds a first threshold voltage and provides a second over-current protection function by modifying the frequency of the VCO when the voltage at the current sense input is greater than a second threshold voltage that is less than the first threshold voltage and modifying the frequency of the VCO when the voltage t the current sense input is less than a third threshold voltage that is less than the second threshold voltage.

33. The method of claim 25 wherein said feedback sensor provides electrical isolation between said feedback voltage input and a DC output of said DC convertor circuit.

34. The method of claim 25 wherein said feedback sensor is an optocoupler.

* * * * *